US010282594B2

(12) United States Patent
Wang et al.

(10) Patent No.: US 10,282,594 B2
(45) Date of Patent: May 7, 2019

(54) ELECTRONIC DEVICE, FACE RECOGNITION AND TRACKING METHOD AND THREE-DIMENSIONAL DISPLAY METHOD (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Hailin Xue, Beijing (CN); Xiaochuan Chen, Beijing (CN); Yingming Liu, Beijing (CN); Xiaoliang Ding, Beijing (CN); Shengji Yang, Beijing (CN); Weijie Zhao, Beijing (CN); Changfeng Li, Beijing (CN); Wei Liu, Beijing (CN); Pengpeng Wang, Beijing (CN); Wenqing Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 76 days.

(21) Appl. No.: 15/538,411

(22) PCT Filed: May 11, 2016

(86) PCT No.: PCT/CN2016/081633
§ 371 (c)(1),
(2) Date: Jun. 21, 2017

(87) PCT Pub. No.: WO2017/147999
PCT Pub. Date: Sep. 8, 2017

(65) Prior Publication Data
US 2018/0107863 A1 Apr. 19, 2018

(30) Foreign Application Priority Data

Mar. 4, 2016 (CN) .......................... 2016 1 0125440

(51) Int. Cl.
G06K 9/00 (2006.01)
H04N 13/31 (2018.01)
H04N 13/366 (2018.01)
G06T 7/20 (2017.01)
H04N 5/232 (2006.01)
H04N 5/33 (2006.01)
H04N 13/305 (2018.01)
H04N 13/376 (2018.01)
H04N 13/398 (2018.01)

(52) U.S. Cl.
CPC ..... *G06K 9/00261* (2013.01); *G06K 9/00248* (2013.01); *G06T 7/20* (2013.01); *H04N 5/232* (2013.01); *H04N 5/23219* (2013.01); *H04N 5/33* (2013.01); *H04N 13/305* (2018.05); *H04N 13/31* (2018.05); *H04N 13/366* (2018.05); *H04N 13/376* (2018.05); *H04N 13/398* (2018.05)

(58) Field of Classification Search
CPC .......... G06K 9/00228; G06K 9/00248; G06K 9/00261; G06K 9/00275; G06K 9/00281; G06T 7/20; G06T 7/285; G06T 7/60; G06T 7/62; G06T 2207/30201; H04N 13/376
See application file for complete search history.

(56) References Cited

U.S. PATENT DOCUMENTS

| 2001/0019620 A1* | 9/2001 | Nagai et al. ....... G06K 9/00228 382/104 |
| 2009/0154801 A1 | 6/2009 | Chou ............................ 382/165 |
| 2010/0128112 A1 | 5/2010 | Marti et al. ..................... 348/51 |
| 2012/0154376 A1 | 6/2012 | Jian ............................... 345/419 |

(Continued)

FOREIGN PATENT DOCUMENTS

| CN | 101197945 A | 6/2008 | ............. H04N 5/262 |
| CN | 101458531 A | 6/2009 | ............... G05D 3/20 |
| CN | 102098524 A | 6/2011 | ............. H04N 13/00 |

(Continued)

OTHER PUBLICATIONS

Yuan-Kui Hu, et al; "Fast Algorithm for Face Contour Detection and Pose Estimation", Pattern Recognition and Artificial Intelligence; vol. 19, No. 5, Oct. 2006, pp. 652-657.

(Continued)

Primary Examiner — Andrew W Johns
(74) Attorney, Agent, or Firm — Ladas & Parry LLP (57) ABSTRACT An electronic device, a face recognition and tracking method and a three-dimensional display method are provided. The electronic device includes: a pick-up device configured to shoot a face image of a user; a frontal face image acquisition module configured to acquire a frontal face image of the user via the pick-up device; and a face tracking module configured to perform a comparison operation on the face image shot by the pick-up device and the frontal face image, and determine a moving distance of the face of the user along a direction in a plane perpendicular to a central optical axis of the pick-up device, wherein the comparison operation includes a comparison between a ratio of an area of a specific part to an area of an entire face for the face image shot by the pick-up device, and the ratio for the frontal face image.

18 Claims, 7 Drawing Sheets (56) References Cited

U.S. PATENT DOCUMENTS

2013/0342669 A1* 12/2013 Hsu ........................ H04N 7/002
348/77

FOREIGN PATENT DOCUMENTS

| CN | 102710956 A | 10/2012 | ............. H04N 13/04 |
| CN | 103019507 A | 4/2013 | ........... G06F 3/0481 |
| CN | 104661012 A | 5/2015 | ............. H04N 13/00 |
| WO | 2013/091201 A1 | 6/2013 | ............. H04N 13/00 |

OTHER PUBLICATIONS

The First Chinese Office Action dated Feb. 12, 2018; Appln. No. 201610125440.9.
ISR and WO dated Oct. 26, 2016; PCT/CN2016/081633.

* cited by examiner

ELECTRONIC DEVICE, FACE RECOGNITION AND TRACKING METHOD AND THREE-DIMENSIONAL DISPLAY METHOD

TECHNICAL FIELD

Embodiments of the present disclosure relate to an electronic device, a face recognition and tracking method and a three-dimensional (3D) display method.

BACKGROUND 3D display technology includes glasses 3D display technology and glasses-free 3D display technology. The glasses 3D display technology requires users to wear glasses or helmets and hence has low comfort level and narrow application scope. The glasses-free 3D display technology can obtain vivid 3D images without any auxiliary device (such as glasses and helmets). Currently, the glasses-free 3D display technology has been applied in devices such as 3D game machines, 3D TVs and 3D lamphouses.

The face recognition technology is currently mainly applied in photographic equipment and video surveillance equipment and is used for achieving the functions such as auto-focusing and security alarm.

SUMMARY

An embodiment of the disclosure provides an electronic device, comprising: a pick-up device configured to shoot a face image of a user; a frontal face image acquisition module configured to acquire a frontal face image of the user via the pick-up device; and a face tracking module configured to perform a comparison operation on the face image shot by the pick-up device and the frontal face image, and determine a moving distance of the face of the user along a direction in a plane perpendicular to a central optical axis of the pick-up device, wherein the comparison operation includes a comparison between a ratio of an area of a specific part to an area of an entire face for the face image shot by the pick-up device, and a ratio of the area of the specific part to the area of the entire face for the frontal face image.

In some examples, the pick-up device includes a plurality of spaced cameras.

In some examples, the pick-up device is an infrared pick-up device.

In some examples, a light barrier layer is disposed on an incident side of the infrared pick-up device and configured to block visible light and transmit infrared light.

In some examples, the electronic device further comprises a function control module configured to detect a number of shielded cameras among the plurality of cameras in the pick-up device, and trigger a specific command according to the number.

In some examples, the specific part include a forehead part, a part on a side of a connecting line of a center of two eyes and an apex of noise and an extension line thereof, or a part on a side of a connecting line of two eyes and an extension line thereof in the face image.

In some examples, the electronic device comprises a three dimensional (3D) display device; and the pick-up device is disposed at a periphery of a display region of the 3D display device.

In some examples, the 3D display device includes an active parallax barrier layer.

In some examples, the 3D display device includes a control chip for display control; and the control chip is configured to adjust a visible area for 3D display according to the moving distance of the face acquired by the face tracking module.

In some examples, the frontal face image acquisition module and the face tracking module are disposed in the control chip.

In some examples, the electronic device includes a central processing unit (CPU) disposed on outside of the 3D display device.

At least one embodiment of the disclosure provides a face recognition and tracking method, comprising: frontal face image acquisition step: acquiring a frontal face image of a user; and face movement determination step: shooting a face image of the user via a pick-up device for recognition, performing a comparing operation on the face image shot by the pick-up device and the frontal face image, and determining a moving distance of the face of the user in a direction in a plane perpendicular to a central optical axis of the pick-up device, wherein, the comparison operation includes a comparison between a ratio of an area of a specific part to an area of an entire face for the face image shot by the pick-up device, and a ratio of the area of the specific part to the area of the entire face for the frontal face image.

In some examples, in the face movement determination step, a plurality of cameras are adopted to shoot the face image of the user.

In some examples, the pick-up device used in the face movement determination step is an infrared pick-up device.

In some examples, the specific part includes a forehead part, a part on a side of a connecting line of a center of two eyes and an apex of noise and an extension line thereof, or a part on a side of a connecting line of two eyes and an extension line thereof in the face image.

At least one embodiment of the disclosure provides a three dimensional (3D) display method, comprising: the face recognition and tracking method according to at least one embodiment of the disclosure; and 3D display adjustment step: adjusting a visible area for 3D display according to the moving distance of the face acquired by the face recognition and tracking method.

In some examples, the 3D display adjustment step includes: determining whether the face moves out of the visible area for 3D display according to the moving distance, and adjusting the visible area for 3D display when the face moves out of the visible area for 3D display, so that the face is disposed in the visible area for 3D display.

In some examples, the 3D display adjustment step includes: adjusting the visible area for 3D display according to the moving distance, so that the face is disposed in a central part of the visible area.

In some examples, the 3D display adopts an active parallax barrier layer; and adjusting the visible area for 3D display includes: moving light barriers or lenticular lenses of the active parallax barrier layer.

In some examples, the frontal face image acquisition step and the face movement determination step are controlled and subjected to data processing by a control chip of a 3D display device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terminology or scientific terminology used herein should have the general meanings understood by those skills in the art to which the present invention belongs. The "first", "second" and similar words used in the present invention application specification and claims do not mean any sequence, amount or importance, but are merely used to distinguish different components. Likewise, "a" or "an" or similar words do not mean the limitation to amount, instead, it refers to at least one.

First Embodiment

Figure 1:
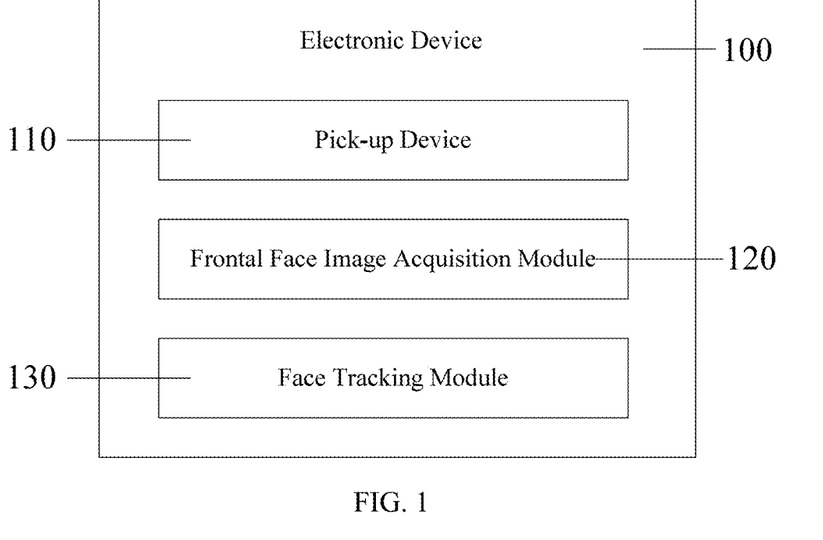
FIG. 1 is an block diagram of an electronic device provided by the embodiment of the present disclosure.

The embodiment of the present disclosure provides an electronic device 100, which, as illustrated in FIG. 1, comprises a pick-up device 110 configured to shoot face images of a user; a frontal face image acquisition module 120 configured to acquire a frontal face image of the user through the pick-up device 110; and a face tracking module 130 configured to compare the face image shot by the pick-up device 110 with the frontal face image and determine the moving distance of the face of the user along a direction in a plane perpendicular to a central optical axis of the pick-up device 110. The comparison operation includes the comparison of the ratio of the area of a specific part to the area of the entire face for the face image shot by the pick-up device 110, and the ratio of the area of the specific part to the area of the entire face for the frontal face image.

The electronic device provided by the present disclosure may obtain the moving distance of the face relative to the electronic device according to the variation of the ratio of the area of the specific part in the face image, shot when the face moves relative to the electronic device, to the area of the entire face. The electronic device may perform a specific operation according to the distance, for example, may adjust a visible area of a 3D display device in the electronic device according to the distance, but the embodiment of the present disclosure is not limited thereto.

For example, the electronic device may include an operating surface or a display surface. When the human face faces the operating surface or the display surface of the electronic device and is at the optimum operating position or viewing position, the face image shot by the pick-up device of the electronic device may be selected as the frontal face image. The frontal face image may be acquired by one shooting of the pick-up device 110. In the shooting process, whether the human face directly faces the operating surface or the display surface of the electronic device may be determined according to the subjective feeling of the user when operating the device, and the human face may be shot when being at the optimum operating position or viewing position. However, due to difference subjective feelings of different users, an image obtained after one shooting may be not an ideal frontal face image. Thus, in some examples, multiple shooting operations may be executed. Subsequently, characteristic points such as the centers of the human eyes or two ends of the lips are extracted from an area corresponding to the face image; the face image is normalized by methods such as machine learning on the basis of the characteristic points; and finally, the normalized face image is stored as the frontal face image.

For example, the face tracking module 130 may also be taken as an eye tracking module. The face recognition and tracking method provided by the embodiment of the present disclosure may also achieve the function of eye tracking. When viewing a display region of the electronic device, the human eyes always focus on a display of the electronic device. When the human face or the electronic device has a slight movement, the human eyes still focus on a mobile phone. The relative position of the eyes on the human face is not much changed. Thus, the position of the human eyes may be determined by determining the contour of the human face, so as to achieve eye tracking.

Figure 2:
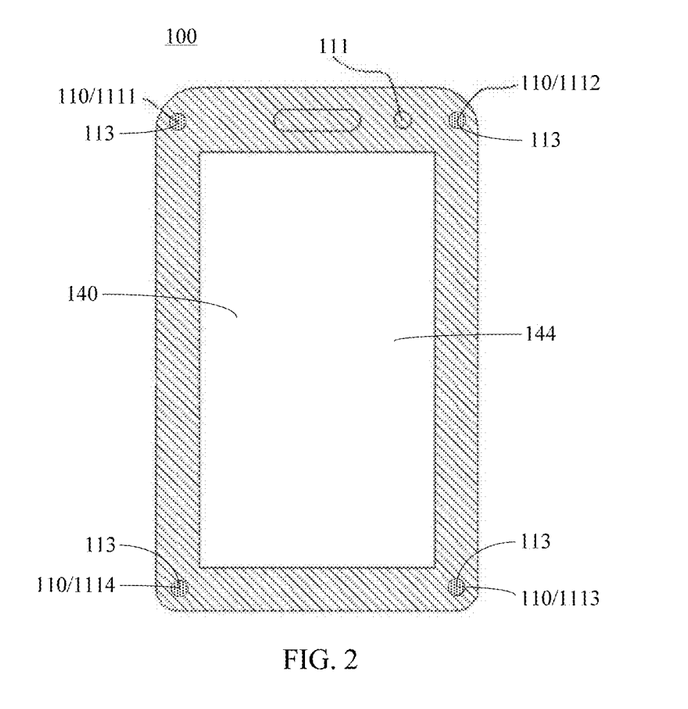
FIG. 2 is a schematic structural view of an electronic device provided by the embodiment of the present disclosure.

FIG. 2 is a schematic structural plan view of an electronic device provided by the embodiment of the present disclosure. For example, the schematic diagram in FIG. 2 displays a front face of the electronic device 100, and the front face may be the operating surface or the display surface of the electronic device 100. As illustrated in FIG. 2, the electronic device 100 is provided with a pick-up device 110. For example, the pick-up device 110 is disposed on the operating surface or the display surface of the electronic device 100, and a central optical axis of the pick-up device 110 may be perpendicular to the display surface or the operating surface of the electronic device 100. The electronic device provided by the embodiment of the present disclosure may detect the moving distance of the face of the user in a plane parallel to the display surface or the operating surface of the electronic device, namely may detect the moving distance of the face of the user along the direction in the plane perpendicular to the central optical axis of the pick-up device. For example, the central optical axis of the pick-up device described here refers to a primary optical axis of an optical lens of the pick-up device. When the pick-up device includes a plurality of cameras, primary optical axes of optical lenses of the plurality of cameras may be parallel to each other.

No special limitation is given here to the pick-up device 100 in the embodiment of the present disclosure, as long as the pick-up device can shoot images capable of being subjected to image processing. For example, in the embodiment as illustrated in FIG. 2, the pick-up device 110 includes a plurality of spaced cameras 1111, 1112, 1113 and 1114. As illustrated in FIG. 2, the camera 1111 is disposed on the top left corner of the electronic device 100; the camera 1112 is disposed on the top right corner of the electronic device 100; the camera 1113 is disposed on the lower right corner of the electronic device 100; and the camera 1114 is disposed on the lower left corner of the electronic device 100. However, the number and the position of the plurality of cameras 110 are not limited to the case in the embodiment of the present disclosure; the number may be 1, 2, 3, 4, 5 or more; and the setting positions may be flexibly arranged according to the specific design of the electronic device. The plurality of arranged cameras may shoot the human face from multiple angles and then may acquire image data from multiple angles, and final shot images may be acquired by the processing, e.g., image fusion, of the plurality of image data, so the determination of the position of the human face can be relatively accurate.

Apart from the pick-up device 110, the electronic device may further comprise a front camera 111. For example, the front camera may be a camera for achieving the conventional shooting function. In the electronic device provided by the embodiment of the present disclosure, the pick-up device 110 is used for shooting for face tracking recognition. However, in the embodiment of the present disclosure, the front camera 111 may also be adopted for shooting for face tracking recognition.

In some examples, the pick-up device 110 in the electronic device 100 is an infrared pick-up device. The infrared pick-up device is easier to detect, recognize and track the human face compared with a common visible light camera, and hence can improve the efficiency of face recognition. The response wave band of the infrared pick-up device includes, e.g., 3-5 μm or 8-12 μm.

In some examples, as illustrated in FIG. 2, a light barrier layer 113 is disposed on an incident side of the infrared pick-up device of the electronic device 100. The incident side refers to a side of the infrared pick-up device facing the user, namely the side from which image light enters the pick-up device. The light barrier layer 113 is configured to block visible light and transmit infrared light. Thus, the light barrier layer 113 will not affect the shooting of the pick-up device 110. In addition, the infrared pick-up device cannot be seen when observed from the front of the mobile phone, so the electronic device can be more beautiful. The light barrier layer 113 may be made from materials which transmit infrared light and block visible light, e.g., materials such as germanium (Ge) or silicon (Si).

Figure 3:
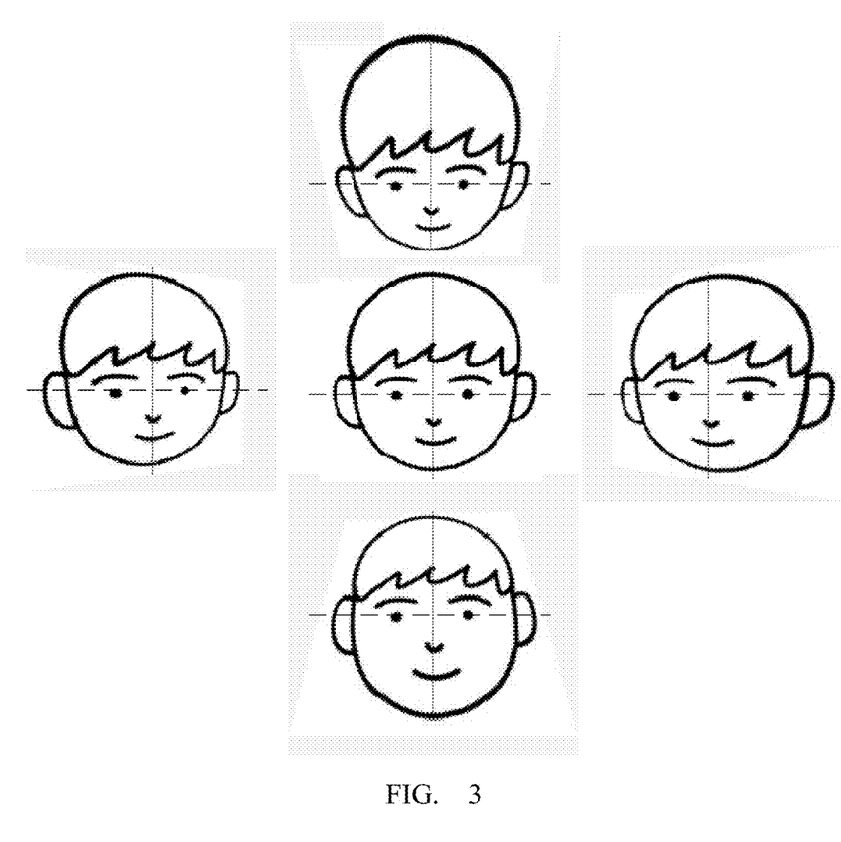
FIG. 3 is a schematic diagram of face images acquired by the electronic device provided by the embodiment of the present disclosure.

Simple description will be given below to the principle of face tracking recognition of the electronic device provided by the embodiment of the present disclosure. FIG. 3 is a schematic diagram of face images acquired by the electronic device provided by the embodiment of the present disclosure. FIG. 3 shows one example of a frontal face image, a top-view face image, a bottom-view face image, a left-view face image and a right-view face image, and two dotted lines in the images respectively represent a connecting line of the center of two eyes and the apex of nose and an extension line thereof, and a connecting line of two eyes and an extension line thereof. In the face images as illustrated in FIG. 3, the top-view face image is an image shot when the human face moves downwards on the plane parallel to the operating surface or the display surface of the electronic device; the bottom-view face image is an image shot when the human face moves upwards on the plane parallel to the operating surface or the display surface of the electronic device; and the left-view face image and the right-eye face image are respectively images shot when the human face moves transversely on the plane parallel to the operating surface or the display surface of the electronic device. For example, the connecting line of the centers of two eyes and the extension line thereof in the images divide the entire human face into an upper part and a lower part. When the human face moves longitudinally relative to the electronic device, the ratio of the area of the upper part (or the lower part) to the area of the entire human face will change. Similarly, the connecting line of the center of two eyes and the apex of nose and the extension line thereof in the images divide the entire human face into a left part and a right part. When the human face moves transversely relative to the electronic device, the ratio of the area of the left part (or the right part) to the area of the entire human face will change. That is to say, the offset direction and size of the human face relative to the electronic device can be determined by comparing the shot face image with the frontal face image, calculating the ratio of the area of the specific part (for example, the upper part, the lower part, the left part or the right part as described above) to the area of the entire face, and comparing the ratio with the ratio of the frontal face image, so that face tracking can be achieved.

It should be noted that the specific parts for ratio calculation in the above examples select the part on a side of the connecting line of the centers of two eyes and the extension line thereof, and the part on a side of the connecting line of the center of two eyes and the apex of nose and the extension line thereof. However, the embodiment of the present disclosure is not limited thereto, and any appropriate specific part may be selected according to the moving direction required to be determined. For example, the forehead part may be selected as the specific part. As for the selection of the specific part, characteristic points of the face (e.g., human eyes and nose) may be extracted, and then the face images are divided according to the characteristic points. Mature algorithms have been already provided for the processing of the face images, e.g., the extraction of the characteristic points, the division of the specific parts, and the calculation of the area. No further description will be given here.

As for the process of obtaining the moving distance according to the variation of the ratio of the specific part, the face tracking module may obtain corresponding moving distance by calculation according to a formula. In addition, the mode of obtaining the moving distance of the face tracking module may also be based on data obtained from learning mode. For example, a large amount of data related to the variation of the ratio of the specific part and the moving distance may be acquired at the learning period.

When determining the moving distance of the face, the face tracking module may obtain corresponding moving distance according to the data.

The moving distance obtained by the electronic device 100 may be adopted as the basis for adjusting relevant parameters of the electronic device. In some examples, as illustrated in FIG. 2, the electronic device 100 comprises a 3D display device 140. The pick-up device 110 is disposed at the periphery of a display region 144 of the 3D display device 140. The moving distance obtained by the electronic device 100 may be used for adjusting a visible area of the 3D display device 140, so that the face can be always at the optimum position of viewing 3D images.

In some examples, the electronic device 100 may determine whether the face has moved out of the visible area for 3D display according to the moving distance, and adjust the visible area for 3D display (for example, moving light barriers or lenticular lenses of an active barrier layer) when the face has moved out of the visible area for 3D display, so that the face can be disposed in the visible area for 3D display. Thus, the user can still view the 3D image after the movement of the face.

In some examples, the electronic device 100 may adjust the visible area for 3D display (for example, moving light barriers or lenticular lenses of an active barrier layer) according to the moving distance, so that the face can be disposed in the middle of the visible area. Thus, the face can be always at the optimum viewing position.

Description will be given below to the process of adjusting 3D display according to the detected moving distance, in the electronic device provided by the present disclosure, with reference to some examples.

Figure 4:
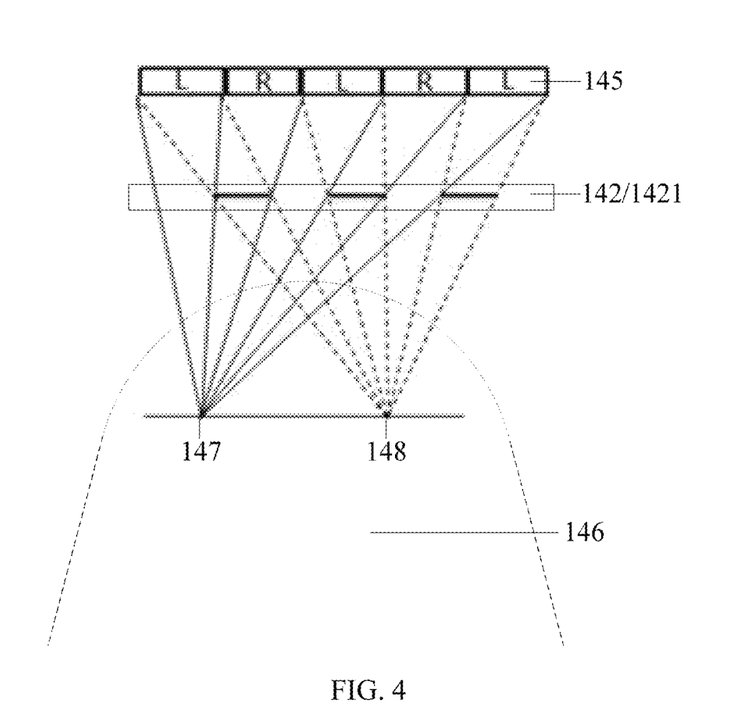
FIG. 4 is a schematic diagram illustrating the display principle of a 3D display device in the electronic device provided by the embodiment of the present disclosure.

For example, as illustrated in FIGS. 4, 5, 6 and 7, in the electronic device provided by the embodiment of the present disclosure, the 3D display device 140 includes a two-dimensional (2D) display 145 and an active parallax barrier layer 142 which are superimposed. The active parallax barrier layer 142 may be active parallax barriers 1421, active lenticular lenses 1422 or other active gratings. As illustrated in FIG. 4, the 2D display 145 includes first display regions L corresponding to a left-eye position 147 and second display regions R corresponding to a right-eye position 148. The first display region L and the second display region R respectively display images corresponding to the left eye and the right eye.

Figure 5:
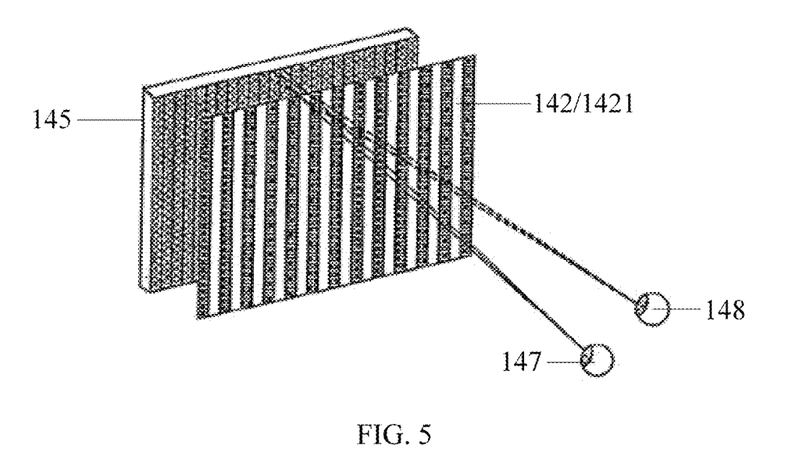
FIG. 5 is a schematic diagram of one example of the 3D display device in the electronic device provided by the embodiment of the present disclosure.
Figure 6:
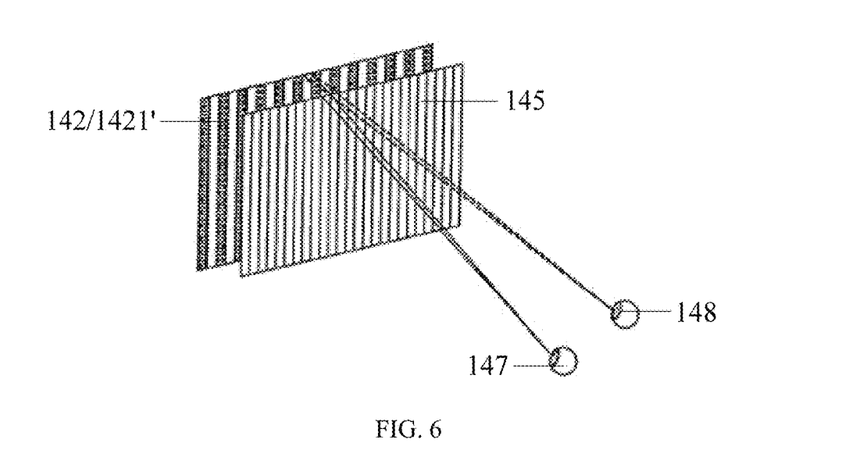
FIG. 6 is a schematic diagram of another example of the 3D display device in the electronic device provided by the embodiment of the present disclosure.

As illustrated in FIGS. 5 and 6, the active parallax barrier layer 142 may be active parallax barriers 1421 or 1421'. For example, as illustrated in FIG. 5, the parallax barriers 1421 are disposed on a side of the 2D display 145 close to the human eyes; and as illustrated in FIG. 6, the parallax barriers 1421' are disposed on a side of the 2D display 145 away from the human eyes. That is to say, the parallax barriers may be front or rear parallax barriers. For example, the 2D display 145 here is a liquid crystal display (LCD) panel. After an image displayed by the 2D display 145 is subjected to the action of the parallax barriers 1421 or 1421', the left eye and the right eye of the human being can view images corresponding to the left eye and the right eye respectively at the left-eye position 147 and the right-eye position 148 respectively, so the 3D display effect can be achieved.

Figure 7:
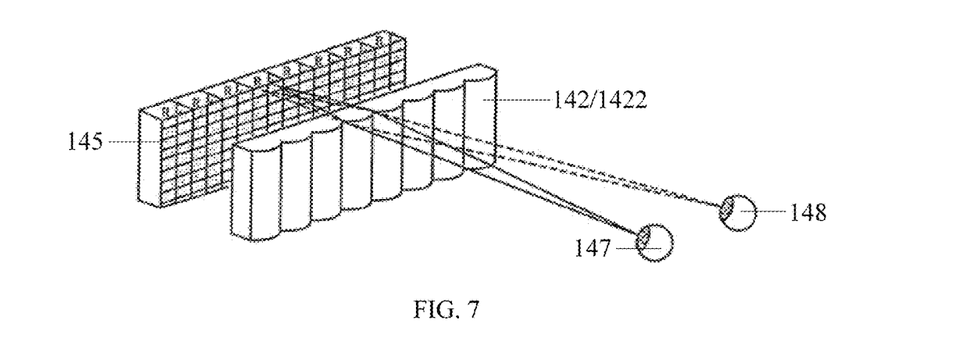
FIG. 7 is a schematic diagram of still another example of the 3D display device in the electronic device provided by the embodiment of the present disclosure.

For example, as illustrated in FIG. 7, the active parallax barrier layer 142 may also be active lenticular lenses 1422. The principle that the active lenticular lenses 1422 are cooperated with the 2D display 145 to achieve the 3D display effect is similar to the principle that the active parallax barriers are cooperated with the 2D display 145 to achieve the 3D display effect. No further description will be given here.

In glasses-free 3D display, the user can view the 3D display image without wearing special glasses. According to the principle of glasses-free 3D display, image light emitted by a display screen is divided by a light-dividing device (e.g., parallax barriers or lenticular lenses) and then enters the left eye and the right eye of the user respectively. In this case, the visible area for 3D display is formed on a display surface of the 3D display device. The 3D visible area may be numerous, but a central visible area disposed in the center has larger range and better effect in viewing the 3D image. The 3D display device in the electronic device provided by the present disclosure may adopt any appropriate 3D display device. No further description will be given here to the detailed structure of the 3D display device. FIG. 4 schematically shows a visible area 146 for 3D display. In the visible area 146, the left eye views the image displayed by the first display regions L and the right eye views the image displayed by the second display regions R, so that the 3D display effect can be achieved. As illustrated in the figure, if the human eyes of the user move out of the visible area 146, the left-eye image and the right-eye image cannot be respectively sent into the left eye and the right eye of the user, so the 3D display effect cannot be achieved.

The visible area of the 3D display device may be adjusted in real time in combination with the face tracking function of the electronic device provided by the embodiment of the present disclosure. For example, the 3D display device may adopt the active parallax barrier layer and hence can adjust the position of the light barriers or the lenticular lenses of the barrier layer, so that the user can be always at the optimum viewing position of 3D display. Description will be given below to some examples on the adjustment of 3D display.

Figure 8:
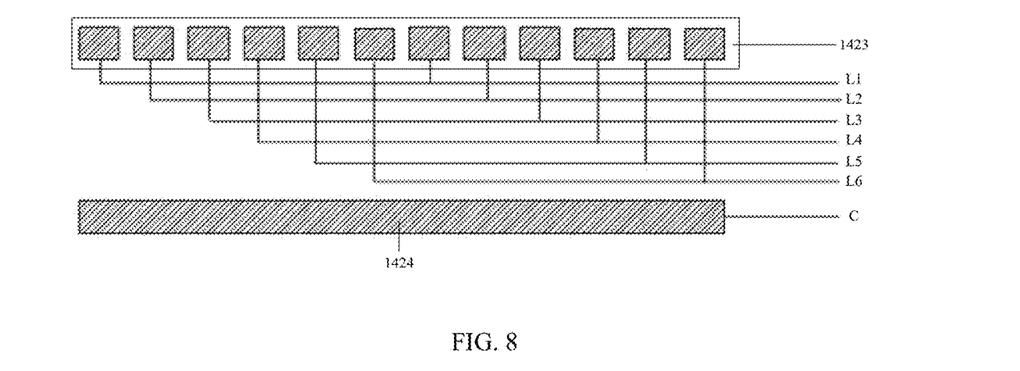
FIG. 8 is a schematic diagram of an active parallax barrier layer in the electronic device provided by the embodiment of the present disclosure.

As illustrated in FIG. 8, the active parallax barrier layer 142 includes a first electrode layer 1423 and a second electrode layer 1424 arranged opposite to each other, and a liquid crystal layer disposed between the first electrode layer 1423 and the second electrode layer 1424. The first electrode layer 1423 includes a plurality of strip subelectrodes arranged in parallel, and the second electrode layer 1424 is a plate electrode. A plurality of spaced light barriers are formed by applying voltage to this part of strip subelectrodes. The light barriers can move on a display plane by changing the strip electrodes applied with voltage. For example, as illustrated in FIG. 7, the plurality of strip subelectrodes are respectively electrically connected with signal lines L1, L2, L3, L4, L5 and L6, and the plate electrode is electrically connected with a common line C. The voltage applied to the strip electrodes may be changed by changing the voltage applied to the signal lines L1, L2, L3, L4, L5 and L6. For example, in initial state, high voltage (the high voltage is, for example, +5V) is applied to the signal lines L1, L2 and L3; low voltage (the low voltage is, for example, 0V) is applied to the signal lines L4, L5 and L6; and low voltage (e.g., 0V) is applied to the common line. At this point, electric fields are formed by high voltage applied to the strip electrodes connected with the signal lines L1, L2 and L3 and low voltage applied to the plate electrode, and liquid crystals at areas corresponding to the strip electrodes connected with the signal lines L1, L2 and L3 are in opaque state under the action of the electric fields. Liquid crystals at areas corresponding to the strip electrodes connected with the signal lines L4, L5 and L6 are in transparent state as the liquid crystals are not subjected to the action of the electric fields. Thus, a plurality of spaced light barriers can be formed. When the offset of the human face is determined, for example, high voltage is applied to the signal lines L2, L3 and L4, and liquid crystals at areas corresponding to strip electrodes connected with the signal lines L2, L3 and L4 are in opaque state under the action of the electric fields; low voltage is applied to the signal lines L5, L6 and L1, and liquid crystals at areas corresponding to strip electrodes connected with the signal lines L5, L6 and L1 are in transparent state; and hence the movement of the light barriers in the display plane can be achieved. It should be noted that the voltage application mode is not limited to the case described in the embodiment of the present disclosure, and may also be other modes according to actual conditions. For example, high voltage is applied to the signal lines L1, L3 and L5; low voltage is applied to the signal lines L2, L4 and L6; and low voltage, e.g., 0V, is applied to the common line. When the offset of the human face is determined, low voltage is applied to the signal lines L1, L3 and L5; high voltage is applied to the signal lines L2, L4 and L6; and the common line is, for example, 0V low voltage.

The frontal face image acquisition module and the face tracking module in the electronic device 100 provided by the embodiment of the present disclosure may be circuits or chips capable of executing required operation instructions. The frontal face image acquisition module and the face tracking module may be disposed in the same chip or different chips.

In some examples, the 3D display device 140 in the electronic device 100 includes a control chip for display control. The control chip is also configured to execute corresponding operations of the frontal face image acquisition module and the face tracking module, apart from display control. That is to say, the frontal face image acquisition module 120 and the face tracking module 130 may be disposed in the control chip. For example, the electronic device 100 may further comprise a central processing unit (CPU) disposed on the outside of the 3D display device 140. The CPU is configured to handle operation instructions, calculations and the like of the electronic device. The CPU and the control chip of the 3D display device are different chips.

Figure 9:
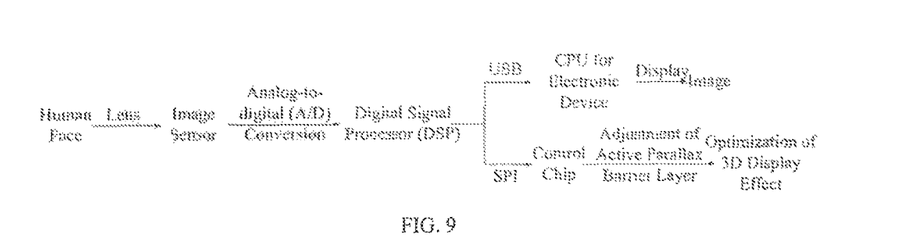
FIG. 9 is a schematic diagram illustrating the working process of the electronic device provided by the embodiment of the present disclosure.

FIG. 9 is a schematic diagram illustrating the working process of the electronic device provided by the embodiment of the present disclosure and the connection structure of partial components. As illustrated in FIG. 9, an image sensor of the pick-up device collects image light signals of the human face through a lens, and converts the collected optical signals into corresponding electrical signals; the electrical signals are subjected to analog-to-digital (A/D) conversion, subjected to processing such as image rendering and comparison through a digital signal processor (DSP), and divided into two paths; one path is transmitted to the CPU of the electronic device through, for example, a universal serial bus (USB) interface, and the signals are processed by the CPU and then subjected to image display; and the other path is transmitted to the control chip of the display device through a serial peripheral interface (SPI), and the SPI is a synchronous serial peripheral interface and may control the control chip and the DSP to be communicated in serial mode to exchange information. The control chip performs data processing according to the signals acquired by the SPI, obtains the foregoing face moving distance, and adjusts the active parallax barrier layer to optimize the 3D display effect. In the electronic device provided by the embodiment of the present disclosure, the calculation for face tracking recognition is executed in the control chip of the display device. The processing capacity of the control chip of the display device can satisfy the requirement of calculating the data, and the data are not required to be transmitted to the CPU of the electronic device for calculation, so the computational resources of the CPU will not be consumed. The setting mode fully utilizes the signal processing resources of the control chip of the display device, saves the resources and the power consumption of the CPU of the electronic device, and achieves the real-time adjustment of the 3D display effect.

It should be noted that the above specific connection mode and data transmission flow are only one example, and the embodiment of the present disclosure may select any other appropriate connection mode and data transmission flow in which the determination of face recognition tracking can be processed by the control chip of the display device. In addition, in the schematic diagram of FIG. 9, the signals are divided into two paths after running through the DSP, in which one path is transmitted to the CPU for display. However, the embodiment of the present disclosure may remove this path of signals, and does not need to display the shot image in the case of face recognition tracking. In addition, although the processing of face tracking recognition via the control chip of the display device can save the resources of the CPU, the embodiment of the present disclosure does not exclude the examples of executing the calculations via the CPU.

In some examples, the frontal face image acquisition module and the face tracking module in the electronic device 100 may be implemented by a processor and a memory. Therefore, the embodiment of the present disclosure further provides an electronic device, which comprises a pick-up device configured to shoot face images of a user; and a processor, a memory and computer program instructions stored in the memory. When the computer program instructions are executed by the processor, the following steps are executed: the frontal face image acquisition step: acquiring a frontal face image of the user; and the face movement determination step: shooting face images of the user via the pick-up device for recognition, comparing the face image shot by the pick-up device with the frontal face image, and hence determining the moving distance of the face of the user along the direction in the plane perpendicular to a central optical axis of the pick-up device. The comparison operation includes the comparison of the ratio of the area of a specific part in the face image shot by the pick-up device to the area of the entire face, and the ratio of the area of the specific part in the frontal face image to the area of the entire face.

When the computer program instructions are executed by the processor, the following step may further be executed: the 3D display adjustment step: adjusting a visible area for 3D display according to the moving distance of the face acquired by the face recognition and tracking method.

The electronic device provided by the embodiment of the present disclosure may, for example, be a mobile phone, a tablet PC, a notebook computer or an e-book.

Second Embodiment

Figure 10:
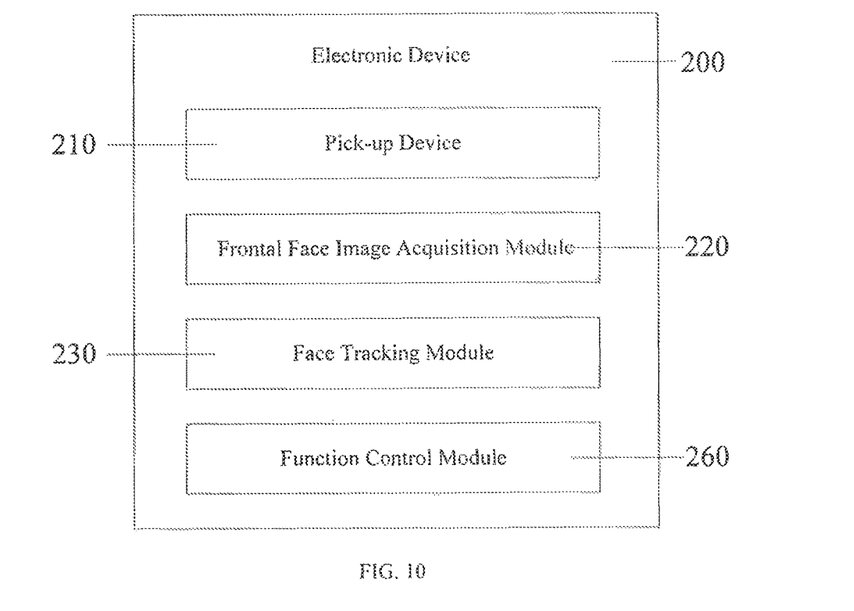
FIG. 10 is a block diagram of an electronic diagram provided by the embodiment of the present disclosure.

The embodiment provides an electronic device 200. FIG. 10 is a block diagram of the electronic device. The difference between the electronic device 200 and the electronic device 100 provided by the first embodiment is that: the electronic device 200 further comprises a function control module 260 which is configured to detect the number of shielded cameras among a plurality of cameras in a pick-up device 210 and trigger a specific command according to the number.

Thus, differential functions can be achieved. For example, when a finger does a long press on a certain camera or several cameras among the plurality of cameras, a specific function may be triggered, for example, a mobile phone will call a specific program such as a music player. Or the electronic device enters the standby state when all the cameras in the plurality of cameras are simultaneously shielded. The pressed camera and corresponding specific function may be customized by user settings, so as to achieve the differential design of the mobile phone.

Parts of the second embodiment the same with the first embodiment employ similar reference numerals of the accompanying drawings. For example, the pick-up device 110 in the first embodiment is the pick-up device 210 in the second embodiment. No further description will be given here to the same parts.

Third Embodiment

Figure 11:
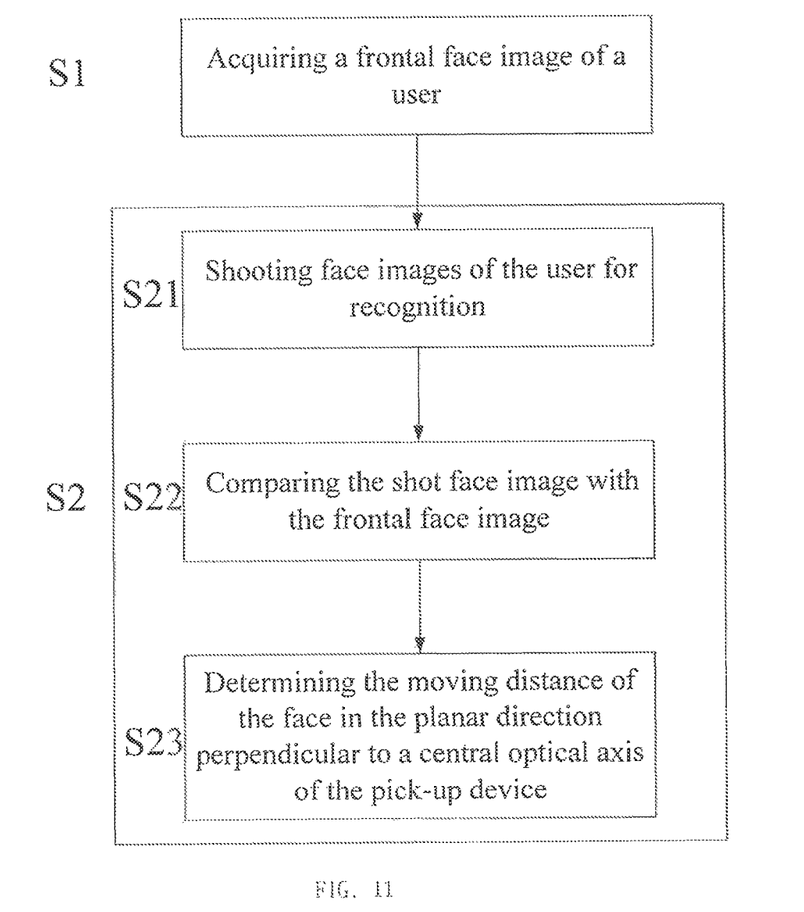
FIG. 11 is a flow diagram of a face recognition and tracking method provided by the embodiment of the present disclosure.

At least one embodiment of the present disclosure further provides a face recognition and tracking method, which, as illustrated in FIG. 11, comprises the following steps S1 and S2.

S1: Frontal face image acquisition: acquiring a frontal face image of a user.

S2: Face movement determination, in which the face movement determination step includes the following steps S21, S22 and S23.

S21: shooting face images of the user via a pick-up device for recognition;

S22: comparing the face image shot by the pick-up device with the frontal face image, in which the comparison operation includes the comparison of the ratio of the area of a specific part in the face image shot by the pick-up device to the area of the entire face, and the ratio of the area of the specific part in the frontal face image to the area of the entire face; and S23: determining the moving distance of the face of the user along a direction in a plane perpendicular to a central optical axis of the pick-up device.

For example, in the face recognition and tracking method provided by one embodiment of the present disclosure, in the face movement determination step S2, a plurality of cameras are used to shoot the face images of the user. The plurality of arranged cameras may shoot the human face from multiplex angles and hence may acquire image data from multiplex angles, and a final shot image may be obtained by the processing, e.g., image fusion, of the plurality of image data, so the determination of the position of the human face can be relatively accurate.

For example, in the face recognition and tracking method provided by one embodiment of the present disclosure, the pick-up device adopted in the face movement determination step S2 is an infrared pick-up device. The infrared pick-up device is easier to detect, recognize and track the human face compared with a common visible light camera, and hence can improve the efficiency of face recognition. The response wave band of the infrared pick-up device includes, e.g., 3-5 µm or 8-12 µm.

For example, in the face recognition and tracking method provided by one embodiment of the present disclosure, the specific parts include the forehead part in the face image, the part on a side of a connecting line of the center of two eyes and the apex of noise and an extension line thereof, or the part on a side of a connecting line of two eyes and an extension line thereof.

As described by the first embodiment, the frontal face image acquisition may be obtained by one shooting of the pick-up device. In the shooting process, whether the human face directly faces an operating surface or a display surface of an electronic device may be determined according to the subjective feeling of the user when operating the device, and the human face may be shot when being at the optimum operating position or viewing position. However, due to difference subjective feelings of different users, an image obtained after one shooting may be not an ideal frontal face image. Thus, in some examples, a plurality of shooting operations may be executed. Subsequently, characteristic points such as the centers of the human eyes or two ends of the lips are extracted from an area corresponding to the face image; the face image is normalized by methods such as machine learning on the basis of the characteristic points; and finally, the normalized face image is stored as the frontal face image.

As for the face movement determination, as described by the first embodiment with reference to FIG. 3, when the human face moves longitudinally relative to the electronic device, the ratio of the area of an upper part (or a lower part) to the area of the entire human face will change. Similarly, the connecting line of the center of two eyes and the apex of nose and the extension line thereof in the images divide the entire human face into a left part and a right part. When the human face moves transversely relative to the electronic device, the ratio of the area of a left part (or a right part) to the area of the entire human face will change. That is to say, the offset direction and size of the human face relative to the electronic device can be determined by comparing the shot face image with the frontal face image, calculating the ratio of the specific part (for example, the upper part, the lower part, the left part or the right part as described above) to the area of the entire face, and comparing the ratio with the ratio of the frontal face image, so that face tracking can be achieved. As for the process of obtaining the moving distance according to the variation of the ratio of the specific part, a face tracking module may obtain corresponding moving distance by calculation according to a formula. In addition, the mode of obtaining the moving distance of the face tracking module may also be based on data obtained from learning mode. For example, a large amount of data related to the variation of the ratio of the specific part and the moving distance may be acquired at the learning period. When determining the moving distance of the face, the face tracking module may obtain corresponding moving distance according to the data.

In addition, other operation steps of the face recognition and tracking method provided by the embodiment may refer to relevant parts described in the first embodiment. No further description will be given here.

Fourth Embodiment

Figure 12:
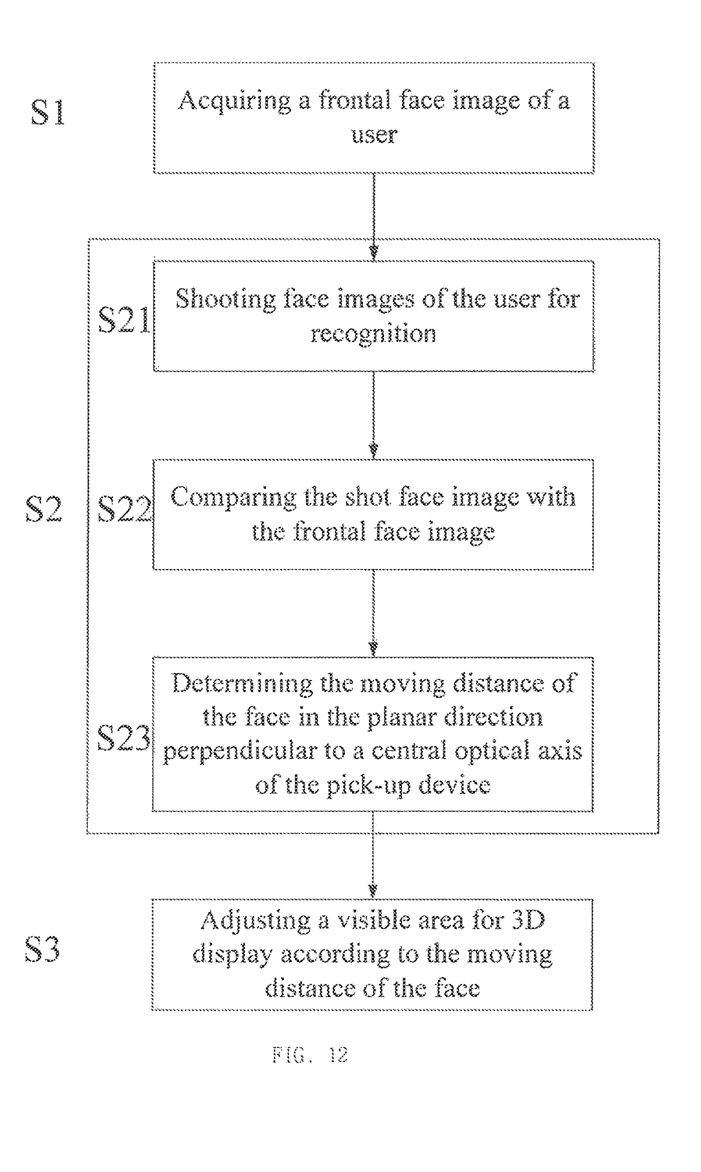
FIG. 12 is a flow diagram of a 3D display method provided by the embodiment of the present disclosure.

At least one embodiment of the present disclosure further provides a 3D display method, which, as illustrated in FIG. 12, comprises: the steps S1 and S2 of the face recognition and tracking method provided by at least one embodiment of the present disclosure; and the 3D display adjustment step S3. In the 3D display adjustment step S3, a visible area for 3D display is adjusted according to the moving distance of the face acquired by the face recognition and tracking method.

The steps S1 and S2 may refer to relevant steps in the face recognition and tracking method provided by the third embodiment. No further description will be given here.

For example, in the 3D display method provided by one embodiment of the present disclosure, the 3D display adjustment step S3 includes: determining whether the face has moved out of the visible area for 3D display according to the moving distance, and adjusting the visible area for 3D display when the face has moved out of the visible area for 3D display, so that the face can be disposed in the visible area for 3D display.

For example, in the 3D display method provided by one embodiment of the present disclosure, the 3D display adjustment step S3 includes: adjusting the visible area for 3D display according to the moving distance, so that the face can be disposed in a central part of the visible area. The central part of the visible area refers to a viewing position capable of obtaining optimum 3D display effect.

For example, in the 3D display method provided by one embodiment of the present disclosure, 3D display adopts an active parallax barrier layer, and the adjustment of the visible area for 3D display includes the movement of light barriers or lenticular lenses of the active parallax barrier layer.

For example, in the 3D display method provided by one embodiment of the present disclosure, the active parallax barrier layer includes a first electrode layer, a second electrode layer, and a liquid crystal layer disposed between the first electrode layer and the second electrode layer. The first electrode layer includes a plurality of strip subelectrodes arranged in parallel, and the second electrode layer is a plate electrode. A plurality of spaced light barriers are formed by applying voltage to partial strip subelectrodes. In addition, the light barriers may move in a display plane by changing the strip electrodes applied with voltage.

For example, in the 3D display method provided by one embodiment of the present disclosure, the frontal face image acquisition step and the face movement determination step are controlled and subjected to data processing by a control chip of a 3D display device. The processing capacity of the control chip of the display device can satisfy the requirement of calculating the data, and the data are not required to be transmitted to the CPU of the electronic device for calculation, so the computational resources of the CPU will not be consumed. The setting mode fully utilizes the signal processing resources of the control chip of the display device, saves the resources and the power consumption of the CPU of the electronic device, and achieves the real-time adjustment of the 3D display effect.

In addition, the steps and methods of 3D adjustment in the embodiment may also refer to relevant content described in the first embodiment. No further description will be given here.

The electronic device, the face recognition and tracking method and the 3D display method, provided by the embodiment of the present disclosure, can ensure that the user can obtain good 3D display effect from multiple angles.

The foregoing is merely exemplary embodiments of the invention, but is not used to limit the protection scope of the invention. The protection scope of the invention shall be defined by the attached claims.

The application claims priority to the Chinese patent application No. 201610125440.9, filed Mar. 4, 2016, the entire disclosure of which is incorporated herein by reference as part of the present application.

The invention claimed is:

1. An electronic device, comprising:
a pick-up device configured to shoot a face image of a user;
a frontal face image acquisition module configured to acquire a frontal face image of the user via the pick-up device; and
a face tracking module configured to perform a comparison operation on the face image shot by the pick-up device and the frontal face image, and determine a moving distance of the face of the user along a direction in a plane perpendicular to a central optical axis of the pick-up device, wherein
the comparison operation includes a comparison between a ratio of an area of a specific part to an area of an entire face for the face image shot by the pick-up device, and a ratio of the area of the specific part to the area of the entire face for the frontal face image.

2. The electronic device according to claim 1, wherein the pick-up device includes a plurality of spaced cameras.

3. The electronic device according to claim 2, further comprising a function control module configured to detect a number of shielded cameras among the plurality of cameras in the pick-up device, and trigger a specific command according to the number.

4. The electronic device according to claim 1, wherein the pick-up device is an infrared pick-up device; and a light barrier layer is disposed on an incident side of the infrared pick-up device and configured to block visible light and transmit infrared light.

5. The electronic device according to claim 1, wherein the specific part include a forehead part, a part on a side of a connecting line of a center of two eyes and an apex of noise and an extension line thereof, or a part on a side of a connecting line of two eyes and an extension line thereof in the face image.

6. The electronic device according to claim 1, wherein the electronic device comprises a three dimensional (3D) display device; and the pick-up device is disposed at a periphery of a display region of the 3D display device.

7. The electronic device according to claim 6, wherein the 3D display device includes an active parallax barrier layer.

8. The electronic device according to claim 7, wherein the 3D display device includes a control chip for display control; and the control chip is configured to adjust a visible area for 3D display according to the moving distance of the face acquired by the face tracking module.

9. The electronic device according to claim 8, wherein the frontal face image acquisition module and the face tracking module are disposed in the control chip.

10. The electronic device according to claim 8, wherein the electronic device includes a central processing unit (CPU) disposed on outside of the 3D display device.

11. A face recognition and tracking method, comprising:
frontal face image acquisition step: acquiring a frontal face image of a user; and
face movement determination step: shooting a face image of the user via a pick-up device for recognition, performing a comparing operation on the face image shot by the pick-up device and the frontal face image, and determining a moving distance of the face of the user in a direction in a plane perpendicular to a central optical axis of the pick-up device, wherein,
the comparison operation includes a comparison between a ratio of an area of a specific part to an area of an entire face for the face image shot by the pick-up device, and a ratio of the area of the specific part to the area of the entire face for the frontal face image.

12. The face recognition and tracking method according to claim 11, wherein in the face movement determination step, a plurality of cameras are adopted to shoot the face image of the user.

13. The face recognition and tracking method according to claim 11, wherein the specific part includes a forehead part, a part on a side of a connecting line of a center of two eyes and an apex of noise and an extension line thereof, or a part on a side of a connecting line of two eyes and an extension line thereof in the face image.

14. A three dimensional (3D) display method, comprising:
the face recognition and tracking method according to claim 11; and
3D display adjustment step: adjusting a visible area for 3D display according to the moving distance of the face acquired by the face recognition and tracking method.

15. The 3D display method according to claim 14, wherein the 3D display adjustment step includes: determining whether the face moves out of the visible area for 3D display according to the moving distance, and adjusting the visible area for 3D display when the face moves out of the visible area for 3D display, so that the face is disposed in the visible area for 3D display.

16. The 3D display method according to claim 14, wherein the 3D display adjustment step includes: adjusting the visible area for 3D display according to the moving distance, so that the face is disposed in a central part of the visible area.

17. The 3D display method according to claim 14, wherein the 3D display adopts an active parallax barrier layer; and adjusting the visible area for 3D display includes: moving light barriers or lenticular lenses of the active parallax barrier layer.

18. The 3D display method according to claim 14, wherein the frontal face image acquisition step and the face movement determination step are controlled and subjected to data processing by a control chip of a 3D display device.

* * * * *